United States Patent
Winteraeken et al.

(10) Patent No.: US 9,928,453 B2
(45) Date of Patent: Mar. 27, 2018

(54) IMAGING SYSTEM FOR PROCESSING A MEDIA

(71) Applicant: Océ-Technologies B.V., Venlo (NL)

(72) Inventors: Stefan A. C. J. Winteraeken, Venlo (NL); Rik W. J. Boonen, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/229,482

(22) Filed: Aug. 5, 2016

(65) Prior Publication Data

US 2017/0039461 A1    Feb. 9, 2017

(30) Foreign Application Priority Data

Aug. 6, 2015 (EP) .................... 15179952
Dec. 8, 2015 (EP) .................... 15198422

(51) Int. Cl.
*G06K 15/00* (2006.01)
*H04N 1/00* (2006.01)
(Continued)

(52) U.S. Cl.
CPC .......... *G06K 15/4065* (2013.01); *B41J 15/04* (2013.01); *G05B 11/42* (2013.01); *G05B 13/04* (2013.01);
(Continued)

(58) Field of Classification Search
CPC .. G06K 15/4065; G06K 15/408; G05B 13/04; G05B 11/42; B41J 15/04;
(Continued)

(56) References Cited

U.S. PATENT DOCUMENTS 4,015,799 A    4/1977   Koski et al.
8,068,262 B2 *  11/2011  Winteraeken ........ B41J 13/0009
                                              347/12
(Continued)

FOREIGN PATENT DOCUMENTS

EP    2 125 377 B1    6/2010
JP    2001-232753 A   8/2001
JP    2015-49613 A    3/2015

*Primary Examiner* — Kent Yip
(74) *Attorney, Agent, or Firm* — Birch, Stewart, Kolasch & Birch, LLP

(57) ABSTRACT

An imaging system includes an imaging station, an actuator for driving a medium roller for controllably displacing the medium along a media transport path, and a controller assembly. The controller assembly includes a sensor device for generating a position signal and a processor for processing the position signal. The actuator is actuated in response to an actuation command from the controller assembly, which actuation command is derivable from a feedback component and a feedforward component. The feedback component is based on a position error. The processor is further arranged for determining a time dependent status parameter, which status parameter represents a status of the medium on the medium roller. The processor is further arranged for deriving an actuation command estimate based on the status parameter, and wherein the feedforward component includes the actuation command estimate.

15 Claims, 3 Drawing Sheets

(51) Int. Cl.
*B41J 15/04* (2006.01)
*G05B 11/42* (2006.01)
*G05B 13/04* (2006.01)

(52) U.S. Cl.
CPC ....... *G06K 15/408* (2013.01); *H04N 1/00702* (2013.01); *H04N 1/00732* (2013.01); *H04N 1/00734* (2013.01); *H04N 1/00779* (2013.01); *B65H 2557/262* (2013.01)

(58) Field of Classification Search
CPC ........... H04N 1/00702; H04N 1/00779; H04N 1/00732; H04N 1/00734; B65H 2557/262
See application file for complete search history.

(56) References Cited

U.S. PATENT DOCUMENTS

| | | |
|---|---|---|
| 2008/0082182 A1 | 4/2008 | Iesaki |
| 2009/0251740 A1* | 10/2009 | Winteraeken ........ B41J 13/0009 358/474 |
| 2011/0211031 A1 | 9/2011 | Satoh et al. |
| 2012/0160117 A1* | 6/2012 | Ohmura ............... B41J 11/0005 101/228 |
| 2014/0239113 A1 | 8/2014 | Igarashi et al. |
| 2015/0166289 A1 | 6/2015 | Oba et al. |
| 2015/0224796 A1 | 8/2015 | Hamano et al. |

* cited by examiner

IMAGING SYSTEM FOR PROCESSING A MEDIA

CROSS-REFERENCE TO RELATED APPLICATIONS

This application claims priority under 35 U.S.C. § 119(a) to Application Nos. 15179952.5 and 15198422.6, filed in Europe on Aug. 6, 2015 and Dec. 8, 2015, respectively. The entire contents of each of the above-identified applications are hereby incorporated by reference into the present application.

BACKGROUND OF THE PRESENT INVENTION

1. Field of the Invention

The present invention relates to an imaging system for processing a media, comprising a media transport path, an imaging station arranged along said media transport path, a displacement device configured to controllably displace the media along the media transport path relative to said imaging station, and a controller assembly.

2. Description of Background Art

In known imaging systems, the media is positioned relative to the imaging station by means of commonly known transport pinches, which are driven by electric motors. The increasing demands for higher image quality and speed result in increasingly strict demands of positioning precision of the media with respect to the imaging station. For example, in a printing system, wherein an image of marking material is applied on a print media, the print media is stepwise displaced relative to the printing station such that the image can be applied in several swaths. In such systems, print media have to be positioned at the exact required position when the marking material is applied. Any deviation of the position of the print media relative to the printing station may result in a degraded image quality, as a result of misplacement of particles of marking material on the print media. In general, due to the stricter positioning requirements, it becomes increasingly more difficult to satisfy the strict positioning tolerances. This imposes higher requirements for the mechanical construction of the displacement device of the media and for the specifications of the electrical drive that is used for driving the displacement device. In general, this leads to an increasingly more complex and expensive construction of the known imaging systems.

EP2125377 (B1) discloses an imaging system, wherein a feedback signal is used to correct for incidental errors, while a feedforward signal corrects for structural influences that negatively influence the positioning of the media. In practice, it has been found that, especially during continued operation, the accuracy of the positioning of the print media relative to the printing station in the above mentioned imaging system is insufficient to obtain high quality printing.

U.S. Application Publication No. 2011/0211031 A1 discloses a method to maintain a constant tension in the medium by adjusting feedback parameters based on the determined torque. A tensioning plate is kept within a predefined working range. U.S. Application Publication No. 2011/0211031A1 aims to accurately control the medium's speed by adjusting the position of the buffer plate. A drawback of U.S. Application Publication No. 2011/0211031A1 is that the medium positioning is secondary to its speed, resulting in incorrectly overlapping bands of the printed image, when printing in consecutive swaths. These positioning artifacts are often directly visible to the user and reduce the image quality. A further drawback is that during long time operation, the accuracy of the method in U.S. Application Publication No. 2011/0211031A1 is reduced, since the feedback mechanism is arranged to correct for incidental changes, but not for long term gradual changes in the system.

U.S. Application Publication No. 2015/0166289 A1 discloses a control scheme to maintain constant tension in a web medium applying feedback and feedforward control loops. Tension sensors are provided for generating a signal to be used in controlling the torque. U.S. Application Publication No. 2015/0166289 A1 suffers from the same drawbacks as U.S. Application Publication No. 2011/0211031A1 as it is concerned with tension control and not medium position. This makes U.S. Application No. 2011/0211031 A1 and U.S. Application Publication No. 2015/0166289 A1 less suitable for high quality prints applied in the graphic arts industry.

SUMMARY OF THE INVENTION

It is an object of the present invention to provide an imaging system with an increased performance with respect to the positioning of a media, without increasing the complexity of the mechanical structure.

In accordance with the present invention, an imaging system for processing a medium supplied from a medium roller and a method for actuating a medium roller in an imaging system are provided.

The imaging system for processing a medium supplied from a medium roller according to the present invention comprises a media transport path, an imaging station arranged along said media transport path, an actuator for driving the medium roller for controllably displacing the medium along the media transport path relative to said imaging station, and a controller assembly. Web or sheet media are provided in rolled up form on the medium roller. The medium roller pushes the sheet along the transport path towards the imaging station, which comprises one or more print heads for swath-wise printing an image on the web medium. The actuator may, for example be an electric motor for driving the medium roller around its rotation axis. The actuator may directly drive the medium roller or via a transmission unit such as a worm wheel.

The controller assembly comprises a sensor device for generating a position signal, which position signal represents a position of the medium along the transport path. The sensor device thereby senses or measures the advancement of the web medium along the transport path. Such a sensor device may comprise an optical sensor, a roll-motor encoder for determining the angular displacing of the medium roller, or a wheel encoder. A processor is provided for processing the position signal from the sensor device. The processor and the sensor device may to this end be connected via a wired or wireless connection, such that the processor is arranged to receive the position data determined by the sensor device.

In operation, the actuator is actuated in response to an actuation command generated by the controller assembly. The controller assembly is arranged for generating the actuation command and transmitting the actuation command to the actuator. The actuator is arranged for displacing the medium roller over an angle or angular range based on the actuation command.

The actuation command is derivable from a feedback component and a feedforward component. The controller assembly, especially the processor, is arranged for determining the actuation command from a feedback component and a feedforward component. The feedback component is based on a position error being the difference between a position setpoint and the position signal. The position setpoint preferably corresponds to the desired position of the medium along the transport path, and, in consequence, to the desired angular position of the medium roller. In an example, the position setpoint may be input position data or an input signal, such as an input voltage for driving the actuator. As such, the feedback component may be used to correct for incidental errors. The controller assembly may comprise a feedback filter for generating the feedback component. A P, PI, PD, or PID controller may be provided in the feedback filter to correct the actuation command in response to the difference between the position setpoint and the position signal.

It is the insight of the inventors that the deviations in the medium positioning in the imaging systems according to the background art are due to the decreasing outer radius of the medium on the medium roller. During operation, web medium is spooled from the medium roller, decreasing the outer radius of the rolled-up medium on the medium roller. This change in the outer radius affects the advancement of the sheet, since the displacement of the medium is proportional to the outer radius and the angular range over which the medium roller is rotated. For example, if the medium roller is actuated to rotate an angle ω, the medium is advanced by a distance ωR. Since the diameter R decreases as the medium is unspooled from the medium roller, the medium advancement is proportionally affected, which, if not properly corrected, results in an inaccurate positioning of the medium and reduced print quality. Further, the inertia of the medium on the medium roller decreases as the medium is unspooled, thus affecting the behavior of the medium roller in response to the actuation forces delivered by the actuator.

It is a further insight of the inventors that the performance of the imaging system may be increased by determining the current status of the medium on the medium roller and using this current status to estimate what the actuation command should be to advance the medium in the desired manner.

According to the present invention, the processor is further arranged for determining a time dependent status parameter. This status parameter represents a status of the medium on the medium roller, and may, for example, comprise information relating to the outer radius, inertia, mass, and/or eccentricity of the medium on the medium roller. In one example, the status parameter is determined from the position signal, by analyzing the position data generated by the sensor device. The status parameter may, in another example, comprise a model, specifically an inverted model system, of the medium and the medium roller. During operation, the mass of the medium on the medium roller decreases over time and the controller assembly adjust the status parameter accordingly. Thereby, the status parameter during operation continually represents the current status of the imaging system, specifically the mass and/or outer radius of the medium on the medium roller.

The processor is further arranged for deriving an actuation command estimate based on the status parameter. The feedforward component comprises the actuation command estimate. For example, the status parameter comprises information regarding the current radius R of the medium on the medium roller, which radius R is used to determine an actuation command. Said actuation command rotates the medium roller by an angle ω, such that the medium advancement ωR corresponds to a desired or predefined value.

Alternatively, the status parameter may comprise information relating to the current mass m of the medium on the medium roller, such that an actuation command may be adapted to include the current dynamics of the system based, e.g. upon Newton's laws.

Since the status parameter is continually adjusted in correspondence to the actual amount of medium on the medium roller throughout operation, the actuation command estimate accurately provides the desired stepwise advancement of the medium. The implementation of the present invention requires little structural adaption of the imaging system and may thus be easily implemented. Thereby the object of the present invention has been achieved.

In an embodiment, when in use and/or during operation, the processor is arranged for continuously adjusting the status parameter in correspondence to a decreasing inertia of the medium roller, specifically the inertia of the medium on the medium roller. The status parameter preferably corresponds to the status of one or more physical properties of the medium on the medium roller, especially to the outer radius (or diameter) and/or the mass of the medium on the support roller. In an exemplary embodiment, the status parameter is a time dependent media roll inertia parameter. The processor is arranged to continually fit the media roll inertia parameter to the actual media roll inertia by analyzing the sensed position signal. Since the amount of medium on the medium roller changes during operation, the status parameter is time dependent and preferably continually determined and/or adjusted to correspond to the current status of the medium on the medium roller. As such, the status parameter accurately represents the medium on the medium roller, allowing for an accurate estimation of the actuation command estimate, and thereby the actuation command, based on this status parameter. This increases the precision of the stepwise advancement of the medium along the transport path. Within the scope of the present invention, continual adjustment includes step-wise, intermittent, iterative, or recursive adjustment of the status parameter. Preferably, the status parameter is adjusted in between consecutive advancement steps of the medium, e.g. during the printing of a swath of the image on the medium. This allows for optimal control of the advancement of the medium by correcting each new medium advancement step based on one or more previous steps. The feedforward component comprising the actuation command estimate based on the status parameter therefore is arranged for accurately determining the actual step size as executed by the media roll actuator motor to match the input setpoint. This manner of very accurate control allows for high quality printing, as is desired in, e.g. the graphic arts industry.

In a preferred embodiment, the processor is further arranged for deriving the time dependent status parameter from the position signal. The processor may then analyze the position data obtained by a sensor device to derive the status parameter, for example by fitting the position data to a curve or model system. Alternatively, the status parameter is iteratively or recursively determined based on a previously determined value of the status parameter and a correction factor based on a difference between the sensed position of the medium and the desired position of the medium. Since the position signal is already used for the feedback component, no additional sensor unit is required, allowing for an easy and cheap implementation of the invention. The feedforward component is derived from the position setpoint by means of the status parameter. The actuation command estimate therefore approximates the predicted future behavior of the media roll, without taking into account how the load reacts instantaneously. For instantaneous or incidental corrections, the feedback component is derived from the sensed position signal. So, the feedback component directly adjusts the output actuation command in correspondence to how the load of the media roll reacts as derived from the positioned signal, while the feedforward component is derived from the position setpoint in order to estimate or predict the media roll's behavior over longer periods. It will be appreciated that the present invention may be easily implemented in existing systems applying only a feedback loop. The feedforward loop runs in parallel to the feedback loop and one preferably is independent of the other.

It will further be appreciated that in the described embodiments, the controller assembly is arranged for positioning the medium. The position of the medium is determined by accuracy of the step spacing during each iteration of the stepwise transport of the medium. The controller assembly preferably applies thereto a position setpoint, which is compared to a sensed position signal, allowing for a precise positioning of the medium. This is in contrast to, e.g. tension or speed control, wherein these latter parameters are accurately controlled to the detriment of the accuracy of the medium position (and/or the positioning step). Accurate stepping improves the image quality.

In an embodiment, the controller assembly further comprises a feedback controller for determining the feedback component based on or from the difference between a position setpoint and the position signal. Preferably, the feedforward component is combined with the feedback component downstream of the feedback controller (i.e. at the output side of the feedback controller). Basically, the control assembly comprises a feedback control loop and a feedforward control loop for respectively determining the feedback component and the feedforward component, which loops are or run parallel to one another. In other words, the feedforward loop bypasses the feedback controller (and in consequence the feedback loop). Both loops are combined at the input of the roll motor to form the actuation command. In another embodiment, the feedback loop is arranged for determining the feedback component from a difference between the position setpoint and the position signal, which allows the control assembly to correct the motion of roll motor based on its history. This is however always after the fact and thus inaccurate. In order correct for 'predictable' future changes, the feedforward loop has been provided. The feedforward loop comprises the status parameter, which forms or defines a model system of the media roll, specifically its inertia. The model system with its status parameter is continually kept up-to-date by input from the position signal. Preferably, the model system is further derived from the input actuation command to allow continuous correction of the feedforward component. In one example, the status parameter is derived from a difference between an input actuation command and a feedforward component. The status parameter is then continuously adjusted such that said difference is minimized, thereby bringing the model system in correspondence with the actual media roll. In a particular advantageous embodiment, the feedforward component is further determined by one or more time derivatives of the position setpoint combined with the status parameter(s). By incorporating the temporal variation of the setpoint, an accurate prediction of the desired or optimum feedforward component can be made. A further advantage of the status parameter is that the start-up time after loading a new media roll is reduced. The model system quickly converges towards realistic or actual values for the media roll. Thereby, productivity is increased.

Preferably, the processor is further arranged for deriving the time dependent status parameter from the actuation command. As such, a relation between the sensed (or actual) position of the medium and the actuation command may be obtained. The status parameter may then comprise a model parameter, which allows the processor to determine or predict the medium displacement based on an input actuation command (or vice versa). Since the relation between the actuation command and the status parameter may be determined in the above described manner, the computation time for generating the actuation command may be reduced.

Further, the processor may be arranged for deriving the actuation command estimate from the status parameter and the position setpoint. The position setpoint corresponds to the desired position of the medium, and may in an embodiment be formed by an input signal for driving the actuator. From the position setpoint, the processor may derive the desired medium position, i.e. where the medium is to be positioned in an upcoming advancement step. As explained above, the status parameter provides a relation between the position of the medium and the actuation command. The actuation command required to accurately position the medium during the upcoming advancement step is derived or estimated from the position setpoint (preferably from one or more of its time derivatives) and the status parameter. Since the status parameter is continually determined, it represents an up-to-date status of the medium on the medium roller, and thereby results in an accurate estimation or prediction for the actuation command based on the position setpoint. The position setpoint may for example be an input signal representing a desired position of the medium or medium roller or be formed by position data, which determines the desired stepwise advancement of the medium. In a basic example, the position setpoint is determined by the desired step size for the medium advancement.

In an embodiment, the processor is further arranged for determining the status parameter based on the position signal and a command error signal, which command error signal is the difference between the actuation command and the actuation command estimate. The command error signal corresponds to the deviation of the actuation command estimate and the actual actuation command applied. This difference is compared to the sensed position of the medium to derive a relation between the command error and the sensed position of the medium, which relation is expressed in the status parameter. This allows the controller assembly to adjust the status parameter in response to the actuation command error, further improving the accuracy and reducing the computation time. When, in a preferred embodiment, the processor applies an inverted model system of the imaging system for determining the actuation command estimate, the difference between the actuation command estimate and the actuation command becomes a measure for the accuracy of the model system. By utilizing this difference, for example in a recursive algorithm, the computation time for deriving the status parameter may be reduced. Furthermore, at the start of operations the convergence time for adjusting the status parameter to the imaging system's properties may be significantly reduced, especially when a recursive least squares algorithm is applied for deriving the status parameter.

In another embodiment, the controller assembly further comprises a memory arranged for storing a status parameter. The processor is arranged for determining a subsequent status parameter from the status parameter stored on the memory. In one example, an initial value or estimate of the status parameter is provided on the memory at the start of the printing operation. Said initial value or estimate is used for iteratively or recursively determining further values of the status parameter. The processor may, in another example, determine the status parameter by analyzing the data on the memory, e.g. by fitting this data to a curve or model system. Preferably, an inverted model system of the imaging system is used. In the latter case, the inverted model system is arranged to minimize the difference between an actuation command and an actuation command estimate, which actuation command estimate is derived from the position signal sensed in respect of said actuation command, i.e. after actuating the actuator based on said actuation command. As such, the inverted model system is arranged to convert a position signal back into the actuation command which positioned the medium at the sensed position. By determining a status parameter based on a previously determined value of said status parameter, the computation of the status parameter may be performed rapidly. Furthermore, the calculation of the status parameter may be performed more efficiently, since the status parameter may be based on a previously determined value stored on the memory.

In a preferred embodiment, the processor is arranged for deriving the actuation command estimate from a time derivative of the position setpoint. The position setpoint or position setpoint signal may be converted into a plurality of dynamic properties, such as jerk, acceleration, and/or velocity. The plurality of time derivatives allows the processor to accurately model the dynamic behavior of the medium advancement. Preferably, the processor is arranged for determining a setpoint velocity, a setpoint acceleration, and a setpoint jerk from the position setpoint. The processor may then determine a corresponding velocity status parameter, a corresponding acceleration status parameter, and a corresponding jerk status parameter. By correspondingly combining the time derivatives with their respective status parameters, a model system of the imaging system is formed, which is preferably inverse to the actual imaging system. It lies within the scope of the present invention to derive additional time derivatives from the position setpoint to increase the accuracy of estimation of the actuation command.

In another embodiment, the controller assembly and the actuator are arranged for stepwise driving the medium roller. The processor is arranged for determining a displacement of the medium per step based on the position signal. Thereby, the stepwise advancement of the medium is accurately monitored and used to determine the status parameter. Advantageously, the imaging system according to the present invention is arranged to determine an actuation command and an actuation command estimate for each step of the advancement of the medium.

In a further embodiment, the controller assembly further comprises a repetitive controller arranged for modeling the eccentricity of the medium roller based on the position signal and for adjusting the actuation command in correspondence to the eccentricity of the medium roller. Since the medium on the medium roller is in practice not fully spherical, its outer radius varies over the circumference of the medium on the medium roller. Further, an eccentricity may be present in one or more components of the drive train for driving the medium roller. To compensate for this variation in radius, the repetitive controller may be arranged to determine said eccentricity by fitting one or more harmonic or periodic base functions to the position signal or position data. The frequency of said base functions is significantly lower than the step frequency of the roller motor, e.g. in the order of magnitude of a revolution period of the medium roller, or higher. By adapting the actuation command to the determined eccentricity of the medium on the medium roller, a precise positioning of the medium is achieved. Basically, once the eccentricity of the medium roller with the medium has been determined or fitted, it can be applied to correct the actuation command for an upcoming advancement step, since the eccentricity repeats cyclically, i.e. with each turn of the medium roller.

In an embodiment, the sensor device comprises an encoder wheel positioned along the transport path between the imaging station and the medium roller. The encoder wheel contacts the medium and determines the medium position or advancement based on the sensed revolutions of the encoder wheel. In a further embodiment, the sensor device further comprises an observer for sensing the angular position of the medium roll. The observer, which may be a roll-motor encoder, determines the rotational position of the medium roller. An encoder is arranged for a precise determination of the medium advancement and/or position without affecting the medium transport.

In an embodiment, the imaging system further comprises transport pinch rollers positioned upstream of the medium roller, and a passive buffer device positioned along the transport path between the medium roller and the transport pinch rollers for resiliently engaging the medium. The buffer zone is arranged to compensate any tension in the medium. Preferably, a tension sensor is provided, which is arranged for sensing the position of the passive buffer. The tension in the medium may then be determined and applied in the feedback or feedforward mechanism in order keep the tension in the medium constant.

In a preferred embodiment, the processor is further arranged for deriving an actuation command estimate by means of an inverted model system of the imaging system. The inverted model system is a model or simulation of the actual imaging system in inverted form, such that when a position signal is input to the model system, it yields an actuation command estimate. Said position signal may be obtained by inputting an actuation command to the actual imaging system and sensing the position of the medium or roller. The inverted model system comprises the status parameter, which status parameter is adjusted by processor to minimize the difference between the actuation command and the actuation command estimate. This allows for an efficient determination of a model system, which is continually adjusted to correspond to changes in the actual imaging system.

In a further embodiment, the controller assembly is arranged to transmit the actuation command to the actuator to transport the medium a step spacing along the transport path, wherein the step spacing is similar (or substantially equal) to a distance defined by the position setpoint. The combined feedback and feedforward control ensures the step spacing is at all times in correspondence with the setpoint, such that the medium may be positioned with great accuracy.

In another aspect, the present invention provides a method for actuating a medium roller in an imaging system, the imaging system comprising a media transport path and an imaging station arranged along said media transport path. The method comprises the steps of: inputting a position setpoint for positioning the medium roller at a predefined angular position, the position setpoint preferably corresponding to a desired angular position of the medium roll; generating a first actuation command for actuating the medium roller based on or from the position setpoint; sensing an angular position of the medium roller, preferably after the medium roller has been actuated to determine the advancement of the medium along the transport path; deriving a feedback component from a position error signal based on the difference between the position setpoint and the position signal, for example by means of a P, PI, PD, or PID controller; deriving a feedforward component from the position setpoint; and generating a second actuation command based on or from the feedback component and the feedforward component.

Basically, stepwise advancement of the medium is controlled by means of a feedback and a feedforward filter or loop. The position signal representing the medium position and/or the angular position of the medium roller is compared to the position setpoint, i.e. the desired position, and the deviation between the two determines the feedback and/or feedforward components.

The method according to the present invention further comprises the step of deriving a time dependent status parameter, the status parameter representing a status of the medium on the medium roller from the position signal and the first actuation command. As explained above, the status parameter adapts to the decreasing inertia or weight of the medium on the medium roller, such that the status parameter at substantially all times accurately represents the status of the medium roller. The step of determining the feedforward component according to the present invention further comprises the step of deriving an actuation command estimate from the status parameter and the position setpoint. As explained above, the actuation command estimate predicts or estimates the actuation command required to position the medium at the desired position. In the method according to the present invention the relevant properties of the medium roll may be incorporated in the status parameter, which is derived from the position signal. In another example, an additional radius sensor may be provided to determine the outer radius of the medium roll to increase accuracy.

In a preferred embodiment, the feedforward component is derived from the position signal sensed after actuating the medium roller by means of the first actuation command. The medium roller is rotated over an angle determined by the first actuation command, after which the position of the medium and/or the medium roller is determined, e.g. by the sensor device. Then, the actuation command estimate is determined from said position signal by means of an adaptive feedforward algorithm. Thus, the sensed position signal is input to the processor, which applies the adaptive feedforward algorithm to derive an estimate for the upcoming actuation command (for the next advancement step). This adaptive feedforward algorithm preferably comprises an inverted model system of the imaging system. Basically, the inverted model system is an accurate model or simulation of the actual imaging system, but inverted such that the actuation command estimate is substantially similar or equal to the first actuation command. If the inverted model system would be a fully accurate representation of the imaging system, the difference between the actuation command estimate and the first actuation command u would be zero or a value close to zero. As such, the difference between the actuation command estimate and the first actuation command provides a good indication of the accuracy of the model system. This difference or command error signal can thereby be efficiently used to correct the model system. In one example, the inverted model system comprises the status parameters, which are recursively derived using said command error signal.

In a further embodiment, the method comprises the step of transmitting the actuation command to the actuator, such that the medium is transported a step spacing along the transport path. The step spacing corresponds or matches the step spacing or prescribed by the position setpoint. This allows for precise control of the medium's position.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
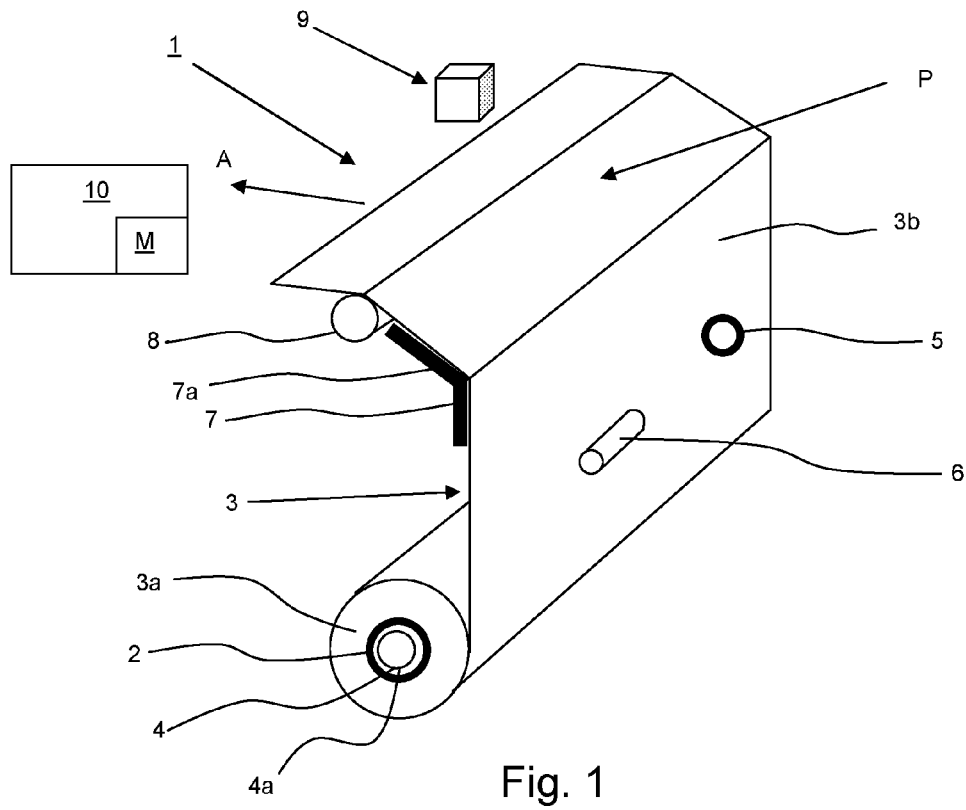
FIG. 1 is a perspective schematic view of an imaging system according to the present invention.

The present invention will now be described with reference to the accompanying drawings, wherein the same reference numerals have been used to identify the same or similar elements throughout the several views.

A schematic drawing of the imaging system 1 according to the present invention is shown in FIG. 1. The medium roller 2 is located at the bottom of FIG. 1. The medium roller 2 holds the rolled up medium 3a. The medium roller 2 is rotatable by a means of an actuator 4 in the form of a motor. From the medium roller 2, the medium 3 extends towards a pinch roller 6. This pinch roller 6 is only used to lead the unspooled medium 3b to a transport pinch 8, when a leading edge of the medium 3 has not yet reached the transport pinch 8. After the pinch 6, the medium 3 passes the sensor device 5, comprising an encoder wheel 5. The encoder wheel 5 is a wheel that is rotatable over the medium 3 to measure the advancement of the transported medium 3. Upstream from the sensor device 5, a passive buffer device 7 is provided. In FIG. 1, the passive buffer 7 is a metal sheet 7, which pushes against the unspooled medium 3b by means of pulley-springs (not shown), thus decreasing the medium-tension to step-error ratio. The medium 3 then passes through the transport pinch 8. The transport pinch 8 is arranged to rotate and thereby advance the medium 3 in highly accurate steps, such that the medium 3 will be positioned correctly with respect to the print head of the imaging station 9.

The medium 3 is advanced stepwise below the print head 9, which print head 9 swath-wise applies an image to the surface of the medium 3. Any inaccuracies originating from the step of medium roller 2 will cause the buffer 7 to be displaced with respect to the transport path P. This changes the tension in the medium 3, and affects the medium 3 positioning below the print head 9. This results in a decrease in print quality as the consecutively applied swaths are not properly aligned with respect to one another.

The position of the buffer 7 with respect to the transport path is a measure for the tension in the unspooled medium 3b. The sensor device 5 may comprise a tension sensor 7a arranged for sensing the position of the passive buffer 7 and determining the tension in the medium 3 from said position. It is preferred that the controller assembly 10 is arranged for maintaining a substantially constant position of the buffer 7 to ensure accurate positioning of the unspooled medium 3b.

Figure 3:
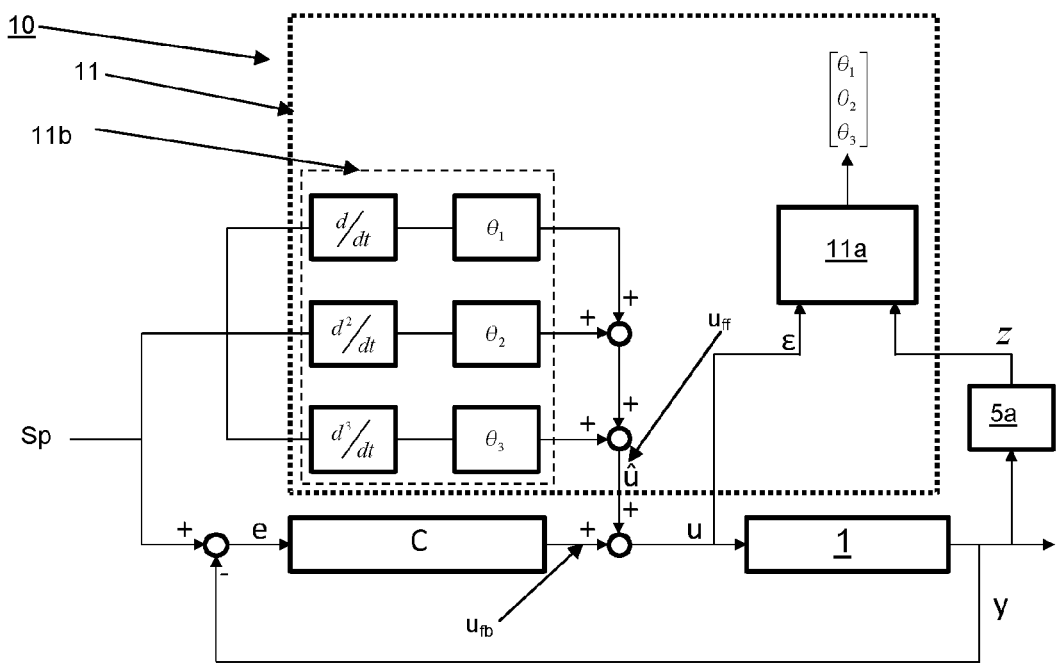
FIG. 3 is a detailed block diagram representing a further embodiment of a controller assembly of an imaging system as shown in FIG. 1.

The actuator 4 is provided for driving the medium roller 2. The actuator 4 is preferably an electric motor, especially an electric DC motor, arranged for stepwise rotating the medium roller over an angle based on an input signal or actuation command u. The input or actuation command u for the motor 4 is generally a voltage applied to the electric roll motor 4. A voltage is applied to a pinch motor (not shown) for driving the transport pinch roller 8. In an embodiment, the actuation command u is used for driving the pinch roller 8, such that the web 3 is advanced by means of the pinch roller 8. The actuator for driving the medium roller 2 is then formed by the motor for driving the pinch roller 8. When stepping (i.e. when advancing the medium 3 stepwise), the pinch roller 8 is driven such that there is a constant tension between the pinch roller 8 and the medium roller 2. As explained above, said tension may be determined by means of a tension sensor 7a. This gives a fixed relation between the input voltages for the motors for the transport pinch roller 8 and the medium roller 2. Thus, a further input voltage or further actuation command for the motor for the transport pinch 8 may be determined from the actuation command u or the input voltage for the medium roller motor 4 via said relation. The imaging system 1 in FIG. 1 comprises a controller assembly 10 for generating said input voltages or actuation commands u, which controller assembly 10 is schematically shown in FIG. 3.

The controller assembly 10 comprises a sensor device 5, the output of which is applied for controlling the roll actuator 4. The sensor device in FIG. 1 comprises a buffer encoder 7a in the buffer 7 for determining the tension in the unspooled medium 3b, as discussed above. Preferably, there is a buffer encoder 7a on either side of the buffer 7 for accurately determining the tension in the unspooled medium 3b from the signals of both buffer encoders 7a. The sensor device 5 further comprises a position sensor, such as an encoder wheel, for determining the position and/or advancement of the medium 3 with respect to the transport path P. Further, the sensor device 5 may comprise an angular sensor, such as a roll-motor encoder 4a, for determining the rotational position of the medium roll 2 and/or the medium roll motor 4. A pinch encoder may further be provided for determining the angular position of the transport pinch roll 8 or it's motor (both not shown). The sensor device 5 is arranged for generating a position signal (y in FIG. 2) representing the position of the medium 3 along the transport path P based on measurements by the encoder wheel 5. The position signal y may further include data from the buffer encoder 7a and the roll-motor encoder 4a, which provide a signal representing the tension in the unspooled medium 3b and the angular position of the roll-motor 4 and/or medium roller 2.

Figure 2:
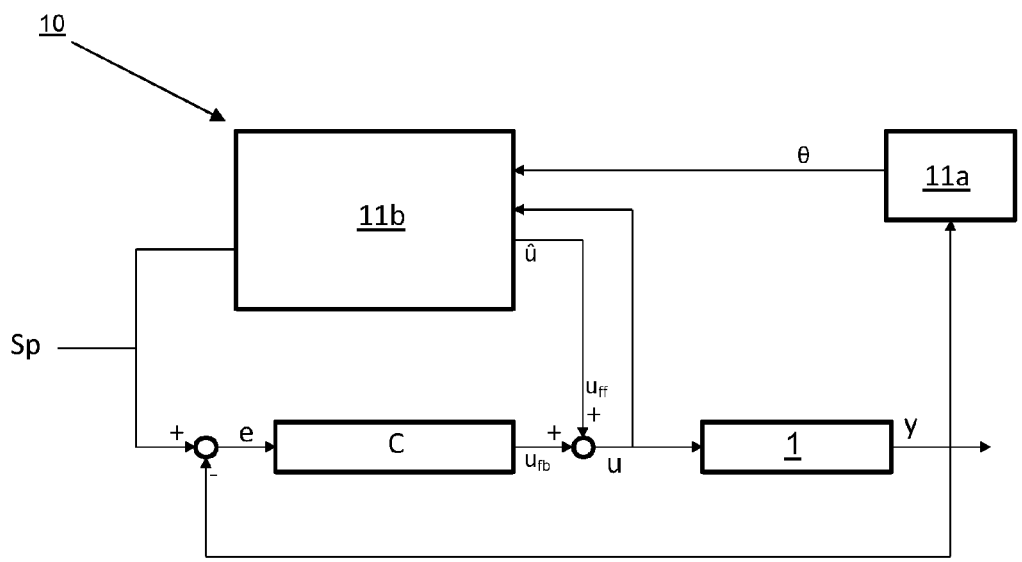
FIG. 2 is a block diagram representing an embodiment of a controller assembly of an imaging system as shown in FIG. 1.

FIG. 2 illustrates a control diagram for a controller assembly 10 according to the present invention. Basically, a setpoint Sp is input to the controller assembly 10 for positioning a medium 3 at a desired position. From said setpoint, an actuation command u is derived for driving the roller motor 4 to move the medium 3 to the desired position. For accurate positioning, the actuation command u is composed of a feedback component $u_{fb}$ and a feedforward component $u_{ff}$. The feedback component $u_{fb}$ is formed by inputting a position error e to a feedback filter C, while the feedforward component $u_{ff}$ is derived from a feedforward algorithm 11b. The feedforward algorithm 11b is adaptive to any changes in the medium 3a on the medium roller 2 by means of a status parameter determination algorithm 11a. The status parameter determination algorithm 11a derives a status parameter θ from among others the position signal y, such that the status parameter θ forms an accurate model system of the imaging system 1, specifically of the medium 3a on the medium roller 2 and preferably the medium roller 2.

A position setpoint Sp is used as input on the left hand side of FIG. 2. This setpoint Sp corresponds to the desired position of the medium 3. The medium 3 is positioned by rotating the medium roller 2 of the imaging system 1 to an angular position. Said rotating is performed by inputting an actuation command u to the roller motor 4. To accurately control the positioning of the medium 3 and the medium roller 2, a position signal y is obtained. Said position signal y corresponds, for example to the medium 3 position or an angular position of the medium roller 2, as determined by the sensor device. On the bottom side of FIG. 2, the position signal y is used in a feedback filter or loop. The position signal y is compared to the setpoint Sp and their deviation is input to a feedback controller C as the position error e to determine the feedback component $u_{fb}$. The feedback component $u_{fb}$ is combined with a feedforward component $u_{ff}$ to form actuation command u for driving the motor 4. The feedforward component $u_{ff}$ is determined by means of a feedforward filter 11b performed by the processor (11 in FIG. 3). The processor 11 applies the algorithm 11b to determine an actuation command estimate û based on a previous actuation command u and the position signal y. From the position signal y, the processor 11 determines a status parameter θ, which is used as input for the algorithm 11b. The status parameter θ is continuously determined from the position signal y by means of an algorithm 11a, such that the value of the status parameter θ corresponds to the current status of the medium 3a on the medium roller 2. By using the status parameter θ as input, the feedforward algorithm 11b becomes adaptive to any changes in the inertia of the medium 3a on the medium roller 2. The status parameter θ forms an always up-to-date model system of the imaging system 1, thereby allowing for a highly accurate estimation of the desired actuation command u. This enables precise positioning of the medium 3 in the imaging system 1 according to the present invention.

A controller assembly according to the present invention is depicted in detailed form in FIG. 3. The control scheme in FIG. 3 is similar to that in FIG. 2, but FIG. 3 comprises additional features and functionalities, which will be discussed below. Over the motor 4 a fixed feedback controller C is used that stabilizes the system 1 for all inertia's. Further, over the buffer 7 a fixed feedback controller C may be used. This controller C over the buffer 7 makes sure that at low frequencies the buffer 7 stays at a fixed position. The feedback controller C is creating a stable loop, but in practice may have a limited bandwidth. To obtain accurate stepping of the medium 3 advancement, a feedforward controller 11 is used, and because of the time variations in the system 1, and specifically in the medium 3a on the medium roller 2, an adaptive feedforward algorithm 11b is applied to estimate the actuation command û required to maintain the following advancement step similar or even identical to the step before it.

In FIG. 3, a block diagram for the controller assembly 10 according to the present invention is shown. A position setpoint Sp or position setpoint signal is input into the controller assembly 10 on the left side of FIG. 3. The position setpoint Sp comprises information representing the desired position of the medium 3 along the transport path P, such as position or step data. Further information representing the desired medium tension at e.g. the buffer 7 maybe provided in the position signal y. Preferably, the position signal y further comprises information representing the desired angular or rotational orientation of the medium roller 2 or its motor 4. The position setpoint Sp may comprise one or more input signals or voltages for the actuator 4 for rotating the medium roller 2 over a desired angle. The position setpoint Sp may be input prior to operation or during operation in a continuous manner.

On the bottom right side of FIG. 3, the imaging system 1 is shown. By means of the sensor device 5, a position signal y is output. In the feedback controller C on the bottom side of FIG. 3, the position signal y is compared to the position setpoint Sp to determine a position error e. It will be appreciated that the angular position of the medium roller 2 may be determined from the position signal y by means of a Luenberger observer 5a. In practice, the direct measurement of the angular orientation of the medium roller 2 may be difficult to implement. The status of the medium roller 2 and/or its actuator 4 may then be determined from the position signal y by the observer 5a. For example, the angular position and rotational velocity of the actuator 4 and/or the medium roller 2 with the medium 3a may be derived from the position signal y, as well as from the current running through the motor 4. In an embodiment, the sensor device 5 provides a tension signal determined by the buffer encoder 7a and an angular signal determined by the angular sensor 4a, which signals are transmitted to the feedback controller C for determining the position error e.

The position error e represents a deviation between the desired position of the medium 3 and the "actual" position of the medium 3 as determined by the sensor device 5. This position error is input to the feedback controller C for generating the feedback component $u_{fb}$ of the actuation command u. In an embodiment, the feedback filter C comprises a proportional component acting on the magnitude of the error signal and a derivative component acting on the rate of change of the error signal e. The resulting feedback component $u_{fb}$ will result in a fast correction of incidental disturbances, while the derivative component introduces enough damping to the controlled system to overcome problems due to overshoot. In imaging systems, it is undesired to oscillate a media during positioning thereof and the media should be in the correct position within a relatively small amount of time. Preferably, the feedback controller C comprises a P, PI, PID, ID, or PD controller. It will be appreciated that the feedback controller C in FIG. 3 may be implemented by means of the processor 11, i.e. as a software-based controller, or as a hardware-based feedback filter.

The controller assembly 10 further comprises a processor 11, which has at least two main functions, namely determining the status parameters $\theta 1$, $\theta 2$, $\theta 3$ and deriving the feedforward component $u_{ff}$ formed by the actuation command estimate û. First, the processor 11 is arranged for determining the one or more time dependent status parameters $\theta 1$, $\theta 2$, $\theta 3$, preferably by means of a status parameter determination algorithm 11a. The status parameters $\theta 1$, $\theta 2$, $\theta 3$ are arranged to represent a status of the unspooled medium 3b on the medium roller 2. In FIG. 3, the status parameters $\theta 1$, $\theta 2$, $\theta 3$ are derived from the position signal y as sensed by the sensor device 5, specifically the wheel encoder 5, and from the actuation command u generated by the controller assembly 10. In FIG. 3, the angular position of the medium roller 2 is determined from the position signal y by means of an observer 5a, such as a Luenberger observer 5a. Such an observer 5a may be applied when a direct measurement of the angular orientation of the medium roller 2 is not possible or is complicated. The angular orientation of the medium roller 2 is then derived by the observer 5a based on, e.g. signals representing the tension in medium 3b, the angular position of the actuator 4, and/or the position of the medium 3. The observer 5a outputs the roller orientation signal z, which signal z represents the angular orientation of the medium 3a on the medium roller 2 (or of the medium roller 2). The observer 5a increases the accuracy of the controller assembly by a precise determination of the medium roller's orientation. It will be appreciated that within the scope of the present invention, the position signal y may be used to determine the status parameters $\theta 1$, $\theta 2$, $\theta 3$ without use of the observer 5a or the signal z. Alternatively, an encoder positioned at the circumference of the medium 3a on the medium roller 2 may be applied.

The status parameters $\theta 1$, $\theta 2$, $\theta 3$ are derived by means of the status parameter determination algorithm 11a. The algorithm 11a applies as inputs the position signal y and the actuation command u. The position signal y may in a preferred embodiment be converted into the roller orientation signal z by means of the observer 5a. Also, both signals y, z may be used. The actuation command u may in another embodiment be processed into a command error $\epsilon$, as will be discussed further on. The status parameter $\theta 1$, $\theta 2$, $\theta 3$ represents the current status of the medium 3a on the medium roller 2. Since the parameters $\theta 1$, $\theta 2$, $\theta 3$ are continuously adjusted and updated to reflect the present amount of medium 3a on the medium roller 2, the status parameter $\theta 1$, $\theta 2$, $\theta 3$ may be considered to form an accurate model representation or system of the medium 3a and the medium roller 2. The status parameter determination algorithm 11a may for example be arranged to obtain the status parameters $\theta 1$, $\theta 2$, $\theta 3$ from data formed by or based on one or more of the signals y, u, û, $\epsilon$, and/or z from sensors 4a, 5, 5a, 7a. The processor 11 is then arranged to analyze said data to determine the status parameters $\theta 1$, $\theta 2$, $\theta 3$, for example by fitting the data to a model system or curve. Preferably, the processor 11 applies a recursive least squares algorithm 11a to recursively determine the status parameters $\theta 1$, $\theta 2$, $\theta 3$. A recursive algorithm 11a has the advantage that computation time is reduced and the status parameters $\theta 1$, $\theta 2$, $\theta 3$ may be determined with great accuracy within the time between two consecutive advancement steps. A further advantage of the recursive algorithm 11a is that it requires relatively little processor power, such that a cheap and/or simple processor 11 may be used. The status parameters $\theta 1$, $\theta 2$, $\theta 3$ may be stored on the memory M for use in the algorithm 11a, for example by recursively determining a status parameters $\theta 1$, $\theta 2$, $\theta 3$ from a previously determined status parameter $\theta 1$, θ2, θ3 stored on the memory M. The memory M may further store information or data related to the position setpoint Sp, actuation command u, actuation command estimate û, position signal y, and/or the roller orientation signal z. In a preferred embodiment, the algorithm 11a is a recursive least squares (RLS) algorithm, which advantageously provides for a rapid and efficient determination of the status parameters θ1, θ2, θ3, as well as a fast convergence of said parameters θ1, θ2, θ3 during the start-up phase of the printing process. Furthermore, the algorithm according to the present invention, specifically said RLS algorithm, is especially well suited for printing processing wherein step sizes are varied, as well as for processes wherein operational parameters such as the inertia of the medium roll 3a vary significantly. This a great advantage of the present invention over iterative learning control (ILC), since ILC is unable to cope properly with said varying step sizes and system parameters. Furthermore, ILC requires a number of ILC circuits specifically designed to a specific system, whereas the algorithm according to the present invention may be applied by means of a processor 11. Thereby, the present invention is easy and cheap to implement.

The actuation command u, which may for example be an input voltage V for driving the electric medium roll motor 4, comprises a feedback and feedforward component $u_{fb}$, $u_{ff}$. The status parameters θ1, θ2, θ3 are applied by the processor 11 for determining the feedforward component $u_{ff}$. In FIG. 3, the position setpoint Sp, which for example is the desired angular position of the medium roller 2, is input to the processor 11 to derive an actuation command estimate $u_{ff}$ by means of a feedforward algorithm 11b. From the position setpoint Sp the processor 11 determines one or more setpoint parameters d/dt, d2/dt2, d3/dt3, such as the time derivatives d/dt, d2/dt2, d3/dt3. Any number or order of time derivatives may be applied. The processor 11 combines setpoint parameters d/dt, d2/dt2, d3/dt3 with the status parameters θ1, θ2, θ3 to obtain an accurate estimate 0 of the actuation command u. By utilizing in the feedforward algorithm 11a the status parameters θ1, θ2, θ3 determined by the algorithm 11a, the feedforward algorithm 11b uses a continuously up-to-date input, such that the estimate û takes into account the decreasing inertia and outer radius of the medium roll 3a as it unspools. As such, the feedforward algorithm 11b provides an accurate estimate û of the command estimate u, which allows for precise stepping and high quality printing.

Example 1

The controller assembly 10 in FIG. 3 further comprises a feedforward controller 11b, which may be either a hardware or software-based controller. The position setpoint Sp is applied as input for determining the feedforward component $u_{ff}$ output by the feedforward controller 11b. From the position setpoint Sp, one or more time derivatives are derived as indicated by the blocks d/dt, d2/dt2, d3/dt3 in FIG. 3. Each block d/dt, d2/dt2, d3/dt3 corresponds to an order of the time derivative of the position setpoint Sp, i.e. d/dt is the first order time derivative of the position setpoint Sp, d2/dt2 is the second order time derivative of the position setpoint Sp, etc. By converting the position setpoint Sp into a plurality of time derivative signals d/dt, d2/dt2, d3/dt3, the dynamics of the system 1 may be identified. The time derivatives d/dt, d2/dt2, d3/dt3 are combined with the status parameters θ1, θ2, θ3 to determine an actuation command estimate û. Preferably, a status parameter θ1, θ2, θ3 is determined by the parameter determination algorithm 11a for each of the time derivatives d/dt, d2/dt2, d3/dt3. The actuation command estimate û, which correspond to the estimated driving voltage for medium roller motor 4, may then be expressed as:

$$\hat{u} \propto \begin{pmatrix} \frac{\partial Ref}{\partial t} \\ \frac{\partial^2 Ref}{\partial t^2} \\ \frac{\partial^3 Ref}{\partial t^3} \end{pmatrix}^T \begin{pmatrix} \theta_1 \\ \theta_2 \\ \theta_3 \end{pmatrix}$$

Thus, the adaptive feedforward algorithm 11b generates an actuation command estimate û, which in FIG. 3 forms the feedforward component $u_{ff}$. The feedfoward component $u_{ff}$ is combined with the feedback component $u_{fb}$ to form the actuation command u. This actuation command u is input into the medium roller motor 4 to advance the medium 3 by a step, such that the step distance applied during each advancement step of the medium 3 is constant or the medium is positioned at a desired and/or predefined position.

Figure 4:
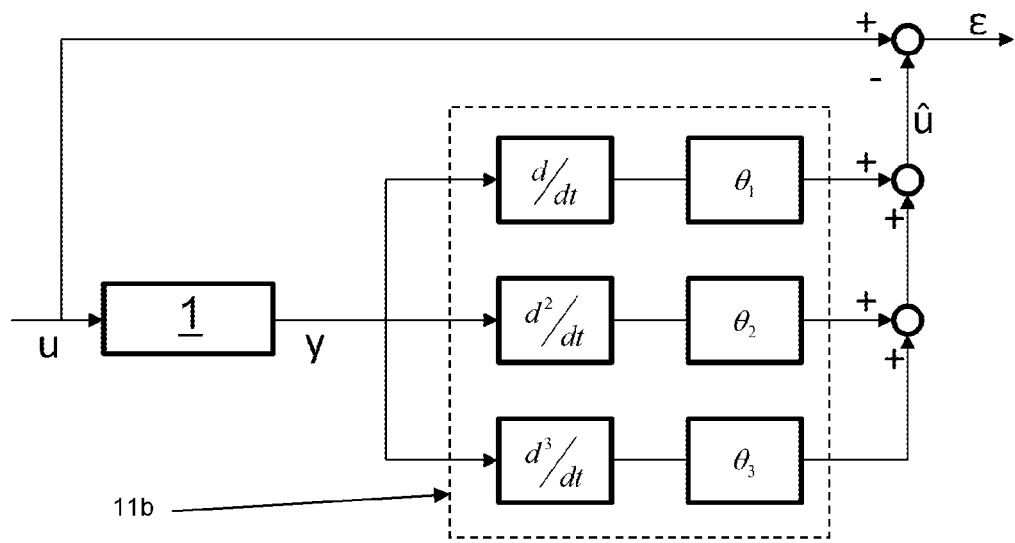
FIG. 4 is a block diagram representing the workings of the adaptive feedforward algorithm applied by the controller assembly in FIG. 3.

The adaptive feedforward algorithm 11b is schematically illustrated in the block diagram in FIG. 4. In FIG. 4, the processor 11 with the adaptive feedforward algorithm 11b is placed in series with the imaging system 1. The medium 3 in the imaging system 1 is advanced based on the actuation command u and the advancement is sensed by means of the sensor device 5, which generates a position signal y, representing the position of the medium 5 along the transport path P. The sensed position signal y is the input to the adaptive feedforward algorithm 11b, which determines a number of time derivatives d/dt, d2/dt2, d3/dt3 from the position signal y. The time derivatives d/dt, d2/dt2, d3/dt3 of the position signal y are then each multiplied with a corresponding status parameter θ1, θ2, θ3 and added together to form the actuation command estimate û. The estimate û is then subtracted from the actuation command u to yield the command error ϵ. From FIG. 4, it may be deduced that when the status parameters θ1, θ2, θ3 form a "perfect" model of the imaging system 1 (or the medium roller 2), the command error ϵ would be zero. Basically, the status parameters θ1, θ2, θ3 are arranged to form a model system, which is substantially the inverse of the imaging system 1. When inputting in the model system ha a detected position y of the medium 3 in the imaging system 1, which position y is the result of an actuation command u, the algorithm 11a would yield an estimate û substantially similar or equal to the command u.

To rapidly and accurately determine the status parameters θ1, θ2, θ3, the controller assembly 10 according to the present invention applies a recursive least squares algorithm 11a. By minimizing the command error E between the actuation command u input to the actuator 4 and the actuation command estimate û determined by the processor 11, the status parameters θ1, θ2, θ3 are adjusted until the actuation command estimate û accurately corrects the actuation command u to bring the medium 3 to a desired position. To this end, the algorithm 11a aims to minimize a cost-function, as defined by:

$$V(t) = \sum_{i=0}^{t} (\epsilon(i)^2 \lambda_1^{t-i})$$

Wherein V(t) is the input voltage of the roller motor 4, and t may be the time or iteration number, corresponding, e.g. to the number of the current advancement step. λ, is a forgetting factor, generally smaller than 1, which allows the algorithm to weigh new measurements with regards to older ones. From FIG. 4, it can further be derived that the command error ε and the actuation command estimate û may be defined as:

$$\epsilon(t) = u(t) - \hat{u}(t)$$

$$\hat{u}(t) = \phi(t)^T \hat{\theta}(t)$$

Wherein $\hat{\theta}(t)$ is a vector comprising the status parameters θ1, θ2, θ3 at time t, while φ(t) is a vector comprising the measured signals y:

$$\phi(t) = \begin{pmatrix} \dot{y}(t) \\ \ddot{y}(t) \\ \dddot{y}(t) \end{pmatrix}$$

The position signal y here preferably comprises a tension signal from the buffer encoder 7a, an angular signal from the roll-motor encoder 4a, and/or a position signal from the wheel encoder 5. Then, by setting the first derivative of V(t) equal to 0, $$\frac{dV}{d\hat{\theta}}(t) = 0$$

the algorithm becomes:

$$\hat{\theta}(t+1) = \hat{\theta}(t) + F(t+1)\phi(t+1)\epsilon(t+1)$$

$$F(t+1) = \frac{1}{\lambda_1}\left(F(t) - \frac{F(t)\phi(t)\phi^T(t)F(t)}{\lambda_1 + \phi^T(t)F(t)\phi(t)}\right)$$

Where, F determines the step-size and is also recursively updated. Note that if φ(t)=0, then F will be unstable, because $\lambda_1$<1. Therefore an enable matrix Q(t) is used. This is a diagonal matrix with a "one" for the parameter to be updated and a "zero" for the parameter that needs to stay the same. For instance when only $\theta_1$ and $\theta_3$ need to be updated this matrix may be:

$$Q(t) = \begin{pmatrix} 1 & 0 & 0 \\ 0 & 0 & 0 \\ 0 & 0 & 1 \end{pmatrix}$$

A matrix W is used to replace $1/\lambda_1$ in the update of F. W is defined as:

$$W(t) = (I - Q(t)) + \frac{1}{\lambda_1}Q(t)$$

The algorithm then becomes:

$$\hat{\theta}(t+1) = \hat{\theta}(t) + Q(t)F(t+1)\phi(t+1)\epsilon(t+1)$$

$$F(t+1) = W(t)\left(F(t) - Q(t)\frac{F(t)\phi(t)\phi^T(t)F(t)}{\lambda_1 + \phi^T(t)F(t)\phi(t)}\right)$$

To analyze the stability of the recursive least squares algorithm 11a passivity (hyperstability) or Lyapunov functions can be used. Tuning of the algorithm 11a can be done by choosing values for $\lambda_1$ and F(0). $\lambda_1$ is typically chosen between 0.85 and 1, and determines the weight on the older measurements. High values for $\lambda_1$ averages zero mean noise better, while lower values will enhance convergence speed. For the imaging system 1, $\lambda_1$=0.999 is preferably selected, as this reduces the effect of noise and the parameters follow the slowly time varying system well. F(0) is usually chosen as a diagonal matrix. The values on the diagonal reflect on the prior information about the optimal values for θ.

Example 2

Figure 5:
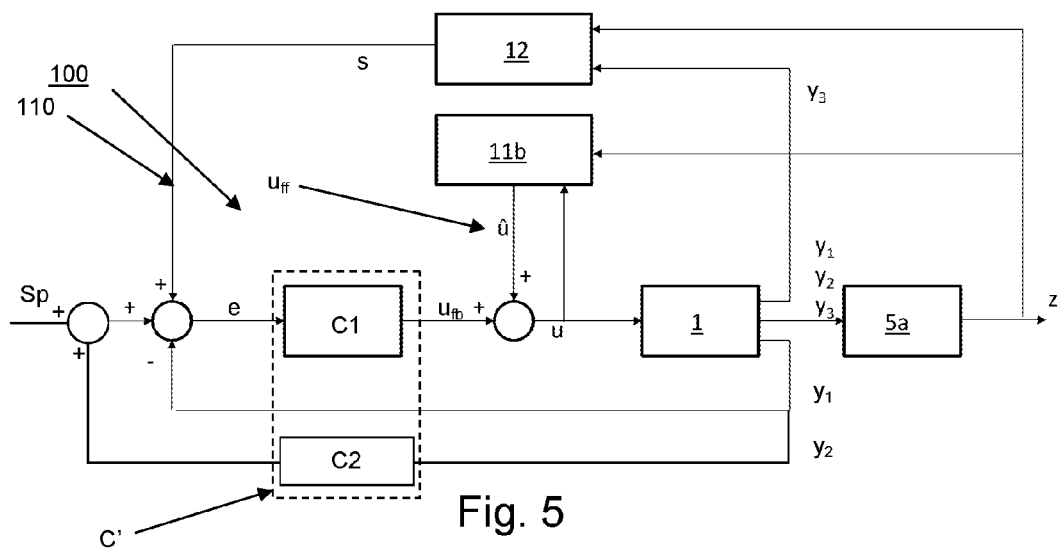
FIG. 5 is a block diagram representing a further embodiment of the imaging system according to the present invention.

In FIG. 5, an imaging system 100 according to the present invention is illustrated as a block diagram. The imaging system 100 comprises a feedback controller assembly C' and a feedforward controller with a feedforward algorithm 11b similar to those described with respect to FIGS. 1-3. The position signal y generated by the sensor device 5 is used as the basis for a feedback or a feedforward signal $u_{fb}$, $u_{ff}$. FIG. 5 illustrates the different components of the position signal y, namely the angular signal $y_1$ representing the angular position of the actuator 4, the tension signal $y_2$ representing the tension in medium 3b, and the advancement signal $y_3$ corresponding to the position of the medium 3. The position signal $y_3$ may be generated by the encoder wheel 5, the tension signal $y_2$ by means of the tension encoder 7a in the buffer 7, while the roll-motor encoder 4a may be applied for obtaining the advancement signal $y_1$.

FIG. 5 shows that the observer 5a determines the medium roller orientation z from the position signal y comprising the signals $y_1$, $y_2$, and/or $y_3$. Though the position signal y may be applied instead of the signal z, the observer 5a increases the accuracy of the controller assembly 10. The position error e is determined based on the angular signal $y_1$ and the tension signal $y_2$. The feedback controller assembly C' comprises first and second feedback controllers C1, C2. The first feedback controller C1 converts the position error e to the feedback component $u_{fb}$ of the actuation command u, similar to the feedback controller C. Preferably, the first feedback controller C1 utilizes the advancement signal $y_1$ as input and compares this to the position setpoint Sp. The second feedback controller C2 is arranged for adjusting the setpoint based upon the tension in the medium 3. The tension signal $y_2$ is input into the second feedback controller C2 to correct the setpoint Sp, especially when the tension in the medium 3 deviates from a predefined value or reference. For example, when the buffer 7 moves, the tension signal $y_2$ changes, and the second feedback controller C2 adjust the setpoint Sp in accordance with the recorded change in the tension signal $y_2$. Thereby, any change in tension in the medium 3 is effectively corrected by adjusting the setpoint Sp. The feedforward component $u_{ff}$ comprises the actuation command estimate û, derived by means of the adaptive feedforward algorithm 11b. The system parameters $\theta_1$, $\theta_2$, $\theta_3$ are recursively calculated from the medium roller orientation z and the actuation command u.

The controller assembly 110 in FIG. 5 further comprises a repetitive controller 12, which is arranged to determine the eccentricity of the medium roll 3a from the position signal y, specifically from the medium roller orientation z and/or the advancement signal $y_3$. The repetitive controller 12 may determine a cyclic disturbance in the position signal y by filtering the step error. Basically, the cyclic disturbance due to the eccentricity of the medium roll 3a is much lower in frequency than the step error in each advancement step. The repetitive controller 12 projects the position signal y onto one or more harmonic base functions or periodic functions, whose frequencies exceed the advancement step frequency. Thereby, the eccentricity may be filtered out from the position signal y. In an example, the cyclic disturbance d may be described by:

$$d = \sum_{i=1}^{N} (\alpha_i \sin(i\phi_l + \beta_i))$$

and also by:

$$d = \begin{pmatrix} \sin(\phi_l) \\ \cos(\phi_l) \\ \sin(2\phi_l) \\ \cos(2\phi_l) \\ \vdots \\ \sin(N\phi_l) \\ \cos(N\phi_l) \end{pmatrix}^T \begin{pmatrix} \theta_1 \\ \theta_2 \\ \theta_3 \\ \theta_4 \\ \vdots \\ \theta_{(2N-1)} \\ \theta_{(2N)} \end{pmatrix} = \tilde{H}^T \theta[k]$$

Figure 6:
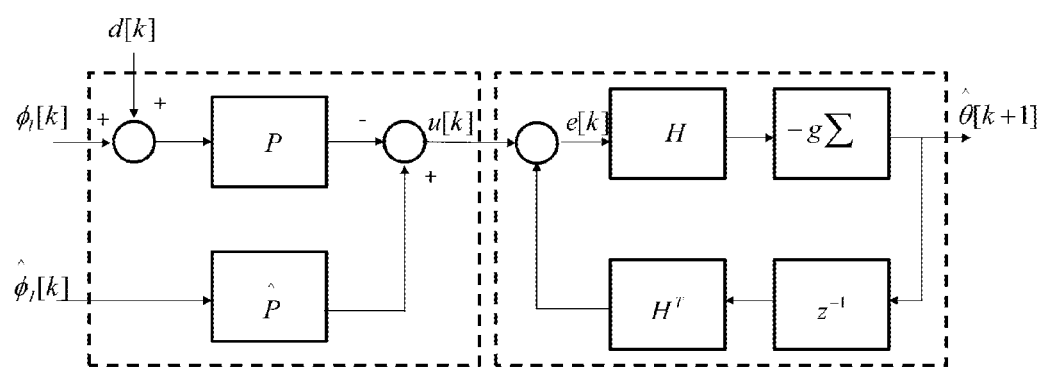
FIG. 6 is a block diagram representing the repetitive controller of the further embodiment of the imaging system in FIG. 5.

The algorithm may apply a plant model to filter the step error from the cyclic disturbance (FIG. 6). Then, the cyclic disturbance may be used to find an estimate for the disturbance using a linear combination of base functions. The linear combination of base functions may be found using a projection algorithm. Therein, this estimation s of the disturbance is subtracted from the position setpoint signal Sp to reject the cyclic disturbance at the output u. The input to the step-error filter is the estimated and real angular position $\hat{\varphi}_l$, $\varphi_l$ of the medium-roll and the disturbance d. P is the actual imaging system 100 with the medium 3 and P is a model of this system 100. The output of this part can be described by:

$$u[k] = \hat{P}\hat{\varphi}_l[k] - P(\varphi_l[k] + d[k])$$

The model is correct for at least low frequencies, such that an actuation signal u[k] where the step-error is partially present, but will not drift away at low frequencies, and the cyclic disturbance is not affected by the step-error. The output u[k] can now be written as:

$$u[k] = -H^T \theta + w[k]$$

Where $H^T \theta$ represents the cyclic disturbance caused by the roll 2, 3. H contains the base functions, and is for example the frequency of the roll 2:

$$H = \begin{pmatrix} \sin(\phi_l[k]) \\ \cos(\phi_l[k]) \end{pmatrix}$$

θ is the linear combination of base functions. This determines the phase and amplitude of the disturbance. w[k] is a signal that includes the residual step-error, noise and higher harmonics not included in H. The buffer 7 or the encoder wheel 5 can be used for measuring the cyclic disturbance. The encoder wheel 5 may be used, to form a more accurate model for the encoder 5. The repetitive controller 12 further uses a projection algorithm to find the parameters. Here, H contains the base functions. The block -gΣ is a summation multiplied by a constant gain -g. The position error e[k] may be written as:

$$e[k] = H^T \hat{\theta}[k] - H^T \theta + w[k] = H^T \tilde{\theta}[k] + w[k]$$

Where $\tilde{\theta}[k]$ is an error between the parameter θ and $\hat{\theta}[k]$. $\hat{\theta}[k+1]$ may then be written as:

$$\hat{\theta}[k+1] = \hat{\theta}[k] - gHe[k]$$

Which may be rewritten to:

$$\tilde{\theta}[k+1] = (I - gHH^T)\tilde{\theta}[k] - gHw[k]$$

The parameters will converge monotonic if:

$$\overline{\sigma}(I - gHH^T) \leq 1$$

Where $\overline{\sigma}(I-gHH^T)$ is the maximum singular value of $(I-gHH^T)$. Monotonic convergence may advantageously be applied, because if the parameters move away from the determined optimum, then it could lead to amplification of the cyclic disturbance. Gain parameter -g may be chosen, such that there is monotonic convergence. Choosing a large -g lets the parameters converge fast. However, when w is large, $\tilde{\theta}$ will oscillate with the same period-time of $\varphi_l$. Therefore $\tilde{\theta}$ is preferably averaged over one period time of the medium-roll 3a rotation, which will decrease the oscillation. By fitting harmonic or periodic base functions with a period (greatly) exceeding the step frequency of the actuator 4, the eccentricity of the medium roll 2 may be derived from the position signal y. This eccentricity may then be applied to further improve the actuation command u by means of an eccentricity correction s, preferably as part of the feedback component $u_{fb}$ and/or the feedforward component $u_{ff}$. This results in highly accurate stepwise advancement of the medium 3, and thereby in high quality printing, since consecutive printing swaths are precisely aligned with respect to one another. Advantageously, the repetitive controller 12 performs especially well in combination with the inverted model system according to the present invention, particularly in combination with the RLS algorithm. Basically, the model system or RLS algorithm filters the disturbances caused by the stepwise displacement of the medium 3 from the signal z, $y_3$ used to determine the eccentricity, effectively providing a "low-noise" input signal z, $y_3$ from which a highly accurate eccentricity may be determined.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An imaging system for processing a medium supplied from a medium roller, comprising:
    a media transport path;
    an imaging station arranged along said media transport path;
    an actuator configured to drive the medium roller for controllably displacing the medium in steps along the media transport path relative to said imaging station; and
    a controller assembly,
    wherein the controller assembly comprises:
        a sensor device configured to generate a position signal representing a position of the medium along the transport path; and
        a processor configured to process the position signal,
    wherein in operation, the actuator is actuated in response to an actuation command generated by the controller assembly, the actuation command being derivable from a feedback component for correcting incidental deviations in a behavior of the medium roller and a feedforward component,
    wherein the feedback component is based on a position error being the difference between a position setpoint and the position signal,
    wherein the feedforward component comprises an actuation command estimate derived by the processor from a time dependent status parameter, the time dependent status parameter representing an inertia of the medium on the medium roller and being derived by the processor from the position signal and the actuation command, and
    wherein during operation the processor is configured to continually fit the time dependent status parameter to the amount of medium on the medium roller.

2. The imaging system according to claim 1, wherein, when in use, the processor is configured to recursively determine the status parameter based on a previously determined value of the status parameter and a correction factor based on a difference between the sensed position of the medium and the desired position of the medium.

3. The imaging system according to claim 1, wherein the processor is further arranged for deriving the actuation command estimate from the status parameter and the position setpoint.

4. The imaging system according to claim 1, wherein the processor is further configured to determine the status parameter based on the position signal and a command error signal, the command error signal being the difference between the actuation command and the actuation command estimate.

5. The imaging system according to claim 1, wherein the controller assembly further comprises a memory arranged for storing a status parameter, and wherein the processor is configured to determine a subsequent status parameter from the status parameter stored on the memory.

6. The imaging system according to claim 1, wherein the processor configured to derive the actuation command estimate from a time derivative of the position setpoint.

7. The imaging system according to claim 6, wherein the processor configured to determine a setpoint velocity, a setpoint acceleration, and a setpoint jerk from the position setpoint, and to determine a velocity status parameter, an acceleration status parameter, and a jerk status parameter.

8. The imaging system according to claim 1, wherein the controller assembly and the actuator are arranged for stepwise driving the medium roller, and wherein the processor is configured to determine a displacement of the medium per step based on the position signal.

9. The imaging system according to claim 1, wherein the controller assembly further comprises a repetitive controller configured to model the eccentricity of the medium roller based on the position signal and to adjust the actuation command in correspondence to the eccentricity of the medium roller.

10. The imaging system according to claim 1, wherein the sensor device further comprises an observer configured to sense the angular position of the medium roll.

11. The imaging system according to claim 1, further comprising transport pinch rollers positioned upstream of the medium roller, and a passive buffer device positioned along the transport path between the medium roller and the transport pinch rollers for engaging the medium.

12. The imaging system according to claim 11, wherein the sensor device comprises a tension sensor configured to sense the position of the passive buffer.

13. The imaging system according to claim 1, wherein the processor is further configured to derive an actuation command estimate by means of an inverted model system of the imaging system, the inverted model system comprising the status parameter.

14. A method for actuating a medium roller in an imaging system, the imaging system comprising a media transport path and an imaging station arranged along said media transport path, the method comprising the steps of:
    inputting a position setpoint for positioning the medium roller at a predefined angular position;
    generating a first actuation command for actuating the medium roller based on the position setpoint;
    sensing an angular position of the medium roller;
    determining a feedback component based on a position error signal based on the difference between the position setpoint and the position signal for correcting incidental deviations in a behavior of the medium roller;
    deriving a feedforward component from the position setpoint;
    generating a second actuation command from the feedback component and the feedforward component;
    deriving a time dependent status parameter, the time dependent status parameter representing an inertia of the medium on the medium roller and being derived from the position signal and the first actuation command; and
    continually fitting the time dependent status parameter to the amount of medium on the medium roller during operation,
    wherein the step of determining the feedforward component further comprises the step of deriving an actuation command estimate from the time dependent status parameter and the position setpoint.

15. The method according to claim 14, further comprising the step of:

deriving the feedforward component from the position signal sensed after actuating the medium roller by means of the first actuation command; and determining the actuation command estimate from said position signal by means of an adaptive feedforward algorithm, the adaptive feedforward algorithm comprising an inverted model system of the imaging system.

* * * * *